W. H. HAGGARD.
FRICTIONAL CLUTCH.
APPLICATION FILED APR. 8, 1909.
938,317.
Patented Oct. 26, 1909.
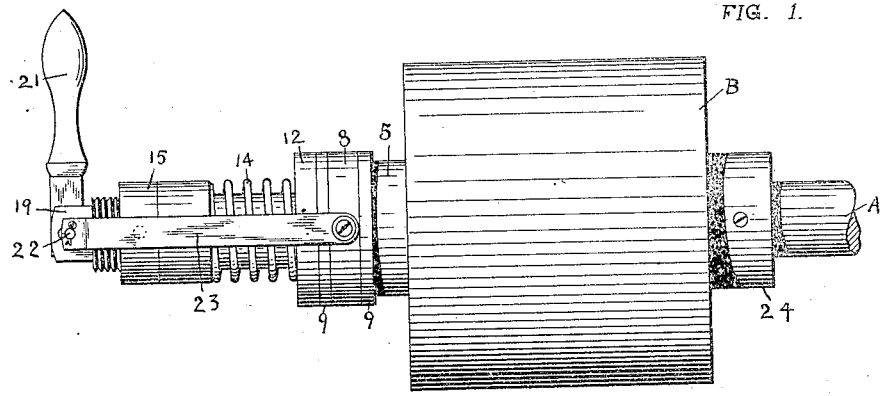
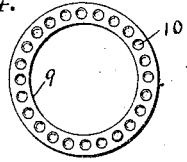
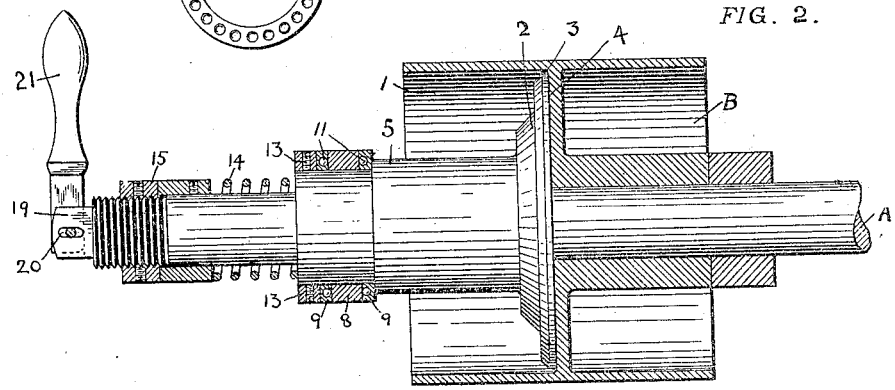
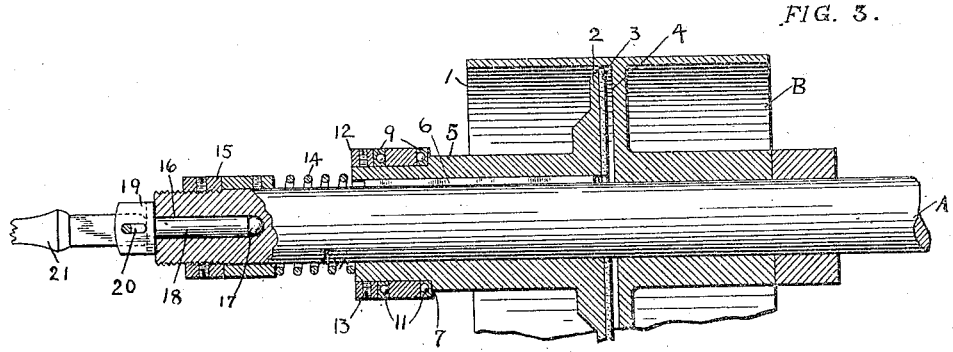
WITNESSES
INVENTOR
William H. Haggard

UNITED STATES PATENT OFFICE.

WILLIAM H. HAGGARD, OF DALLAS, TEXAS.

FRICTIONAL CLUTCH.

938,317.   Specification of Letters Patent.   Patented Oct. 26, 1909.

Application filed April 3, 1909. Serial No. 488,541.

*To all whom it may concern:*

Be it known that I, WILLIAM H. HAGGARD, a citizen of the United States, residing at Dallas, in the county of Dallas and State of Texas, have invented certain new and useful Improvements in Frictional Clutches, of which the following is a specification.

My invention relates to an improvement in frictional clutches, and the object is to provide a clutch which can be constructed and applied to pulleys of different sizes.

The invention consists of certain novel features of construction and combinations of parts which will be hereinafter described and pointed out in the claims.

In the accompanying drawings—Figure 1 is a view in side elevation; Fig. 2 is a longitudinal sectional view; Fig. 3 is a detailed sectional view, and Fig. 4 is a detailed view.

A represents the shaft, and B is a pulley mounted thereon which is provided with a recess 1 for the reception of the frictional disk 2. The face of the disk 2 is preferably covered with leather or other material 3, which is adapted to come in contact with the face 4 of the pulley B for forming the frictional engagement. The hub 5 of the disk is keyed or splined to the shaft A as at 6. A shoulder 7 is formed on the hub and bearing against the shoulder is a shifting collar 8. Ball rings 9, which are provided with pockets 10 in which the balls 11 are received, are mounted upon the hub 5 and against the shifting collar 8. A collar 12 is mounted upon the hub and is held thereto by means of screws 13, 13. The ball bearing ring permits of movements of the collar 8 without causing any frictional engagement. A coil spring 14 is mounted on the shaft, one end of which bears against the hub 5 and the other end against a screw-threaded nut 15, which is adapted to screw on the end of the shaft. A recess 16 is formed at one end of the shaft in which is received a ball bearing 17, and received in the recess upon the ball is a stud shaft 18, which is provided with a forked end 19, the forked portion having elongated slots 20 formed therein. A handle or lever 21 is received in the forked end 19, and connected thereto by a pin 22 passing through the elongated openings or slots 20 and through the end of the handle or lever 21. Straps or bars 23 are connected to the shifting collar 8 and to the pin 22. A collar 24 is connected to the shaft A for holding the pulley in proper position thereon.

The end of the handle or lever 21 acts as a cam for breaking the contact between the frictional disk and pulley B when the end of the handle is brought into contact with the end of the stud shaft 18. When the handle is thrown vertically or at right angles to the shaft A the disk is thrown into contact with the face of the pulley B. The distance from the pivotal connection or pin 22, which passes through the handle 21 is less between the pin and the side of the handle than from the end of the handle so that when the handle is extended at right angles to the shaft A the disk 2 will be thrown into contact with the face of the pulley 23. The elongated slots 20 permit of the pin being drawn toward the outer ends of the forks 19 when the handle is thrown down so that it is in a straight line with the shaft A, causing the disk 2 to be drawn away from the face of the pulley B.

From the foregoing it will be seen that I have provided means for shifting the frictional disk into or out of engagement with the pulley B, which is loosely mounted upon the shaft A by simply throwing the lever to a vertical position or at right angles to the shaft for making the contact between the two members and by throwing the lever so that it will lie in a straight line with the shaft for breaking the contact between the two members.

It is evident that more or less slight changes might be made in the form and arrangement of the several parts described without departing from the spirit and scope of my invention, and hence I do not wish to be limited to the exact construction herein set forth, but:

Having fully described my invention what I claim as new and desire to secure by Letters Patent is:

1. A frictional clutch comprising a shaft, a pulley mounted on the shaft, a friction disk slidably mounted on the shaft, a stud shaft mounted in the shaft, a lever pivotally connected to the stud shaft, and means connecting the disk and lever whereby the disk is shifted upon the operation of the lever.

2. A frictional clutch comprising a shaft, a pulley mounted thereon, a frictional disk slidably mounted on the shaft and adapted to engage the pulley, a stud shaft having a forked end mounted in the shaft, a lever loosely mounted in the forked end of the shaft, means connecting the disk and lever, and a cam on the lever for shifting the position of the disk upon the operation of the handle.

3. A friction clutch comprising a shaft, a pulley mounted thereon, a friction disk slidably mounted on the shaft and adapted to engage the pulley, a stud shaft having a forked end mounted in the shaft, elongated slots formed in the forked ends, a lever loosely mounted in the elongated slots, means connecting the disk and lever, and a cam on the lever for shifting the position of the disk upon the operation of the handle.

4. A frictional clutch comprising a shaft, a pulley mounted thereon, a frictional disk slidably mounted upon the shaft adapted to engage the pulley, a hub on the disk, a shifting collar mounted on the hub, a ball ring mounted on the hub, and a collar connected to the hub for holding the ball ring and shifting collar on the hub, a coil spring mounted on the shaft, one end of which bears against the hub, a nut received on the shaft bearing against the other end of the spring, a stud shaft mounted on the shaft having a forked end, a lever loosely mounted in the forked end of said shaft, bars connecting the lever and shifting collar, and a cam on the lever for shifting the friction disk upon the movement of the lever.

5. A frictional clutch comprising a shaft, a pulley mounted on the shaft, a frictional disk slidably mounted on the shaft having a hub, a collar loosely mounted on the hub, a coil spring on the shaft bearing against the hub, a nut on the shaft engaging the other end of the spring, and a lever connected to the collar for operating the disk and drawing against the spring whereby the disk will be thrown into engagement with the pulley by the action of the spring when the disk is released by the lever.

In testimony whereof I affix my signature, in the presence of two witnesses.

WILLIAM H. HAGGARD.

Witnesses:
S. M. SPEAKE,
J. N. SHACKLETT.